United States Patent
Ogasawara et al.

(10) Patent No.: US 10,245,862 B2
(45) Date of Patent: Apr. 2, 2019

(54) POWER SUPPLY APPARATUS, PRINTER, AND CONTROL METHOD

(71) Applicant: CANON KABUSHIKI KAISHA, Tokyo (JP)

(72) Inventors: Yasufumi Ogasawara, Tachikawa (JP); Takashi Sakai, Kawasaki (JP); Hisao Okita, Yokohama (JP); Shinya Ishikawa, Kawasaki (JP); Toru Oshika, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/162,335

(22) Filed: May 23, 2016

(65) Prior Publication Data

US 2016/0347097 A1  Dec. 1, 2016

(30) Foreign Application Priority Data

May 27, 2015  (JP) .................. 2015-107871

(51) Int. Cl.
*H02J 7/00* (2006.01)
*B41J 23/00* (2006.01)
(Continued)

(52) U.S. Cl.
CPC ............. *B41J 23/00* (2013.01); *B60L 11/005* (2013.01); *H02J 7/0057* (2013.01);
(Continued)

(58) Field of Classification Search
CPC combination set(s) only.
See application file for complete search history.

(56) References Cited

U.S. PATENT DOCUMENTS

| 4,284,944 A | * | 8/1981 | Iwanaga | ............... | H01M 10/44 320/139 |
| 4,607,324 A | * | 8/1986 | Gibbons | ............... | H02M 7/155 363/128 |

(Continued)

FOREIGN PATENT DOCUMENTS

| CN | 102403551 A | 4/2012 |
| CN | 104335447 A | 2/2015 |

(Continued)

*Primary Examiner* — Matthew Luu
*Assistant Examiner* — Lily Kemathe
(74) *Attorney, Agent, or Firm* — Canon U.S.A., Inc. IP Division (57) ABSTRACT

A power supply apparatus includes a power source unit configured to supply electric power to an electric load, a capacitor connected to a power supply line extending from the power supply unit to the electric load, a charge circuit configured to charge the capacitor while restricting a current value of the electric power supplied from the power source unit, a specifying unit configured to specify a voltage value of the capacitor, a first determination unit configured to determine whether the charge of the capacitor is completed in accordance with the voltage specified by the specifying unit, and a second determination unit configured to determine whether the voltage specified by the specifying unit is equal to or smaller than an error threshold value after the first determination unit determines that the charge of the capacitor is completed.

15 Claims, 7 Drawing Sheets

(51) Int. Cl.
  *H02M 7/02* (2006.01)
  *H02M 3/156* (2006.01)
  *B60L 11/00* (2006.01)
  *H02J 7/04* (2006.01)
  *H02J 7/34* (2006.01)

(52) U.S. Cl.
  CPC .......... *H02J 7/0068* (2013.01); *H02J 7/0075* (2013.01); *H02J 7/045* (2013.01); *H02M 3/156* (2013.01); *H02M 7/02* (2013.01); *B60L 2270/20* (2013.01); *H02J 7/345* (2013.01)

(56) References Cited

U.S. PATENT DOCUMENTS

| | | | | |
|---|---|---|---|---|
| 5,376,831 | A * | 12/1994 | Chen | H03K 17/166 327/111 |
| 5,821,951 | A * | 10/1998 | Fujii | B41J 2/04541 347/10 |
| 5,969,505 | A * | 10/1999 | Okamura | H02J 7/345 320/122 |
| 5,977,748 | A * | 11/1999 | Okamura | B60L 11/005 320/118 |
| 6,369,576 | B1 * | 4/2002 | Matthews | G01R 19/0092 320/106 |
| 6,533,074 | B2 * | 3/2003 | Tominaga | B66B 1/30 187/290 |
| 6,831,449 | B2 * | 12/2004 | Nishida | H02M 3/156 323/222 |
| 7,019,560 | B2 * | 3/2006 | Wimmer | B41J 2/04541 326/68 |
| 7,183,748 | B1 * | 2/2007 | Unno | H02J 7/0013 320/134 |
| 7,215,106 | B2 * | 5/2007 | Sato | B41J 29/393 323/282 |
| 7,317,274 | B2 * | 1/2008 | Vogeley | F04B 43/046 310/316.01 |
| 7,600,840 | B2 * | 10/2009 | Kim | B01J 19/0046 347/14 |
| 8,148,945 | B2 * | 4/2012 | Watanabe | H02H 9/001 320/128 |
| 8,171,802 | B2 * | 5/2012 | Henderson | G01F 23/24 73/861.12 |
| 8,398,188 | B2 * | 3/2013 | Nakata | B41J 2/04541 323/234 |
| 8,446,135 | B2 * | 5/2013 | Chen | H02M 3/156 323/271 |
| 8,729,955 | B2 * | 5/2014 | Nien | H02M 3/1588 323/369 |
| 9,048,687 | B2 * | 6/2015 | Nakajima | H02J 1/108 |
| 9,104,129 | B2 * | 8/2015 | Sasaki | H02J 7/0016 |
| 9,122,187 | B2 * | 9/2015 | Sasaki | H02J 7/0016 |
| 9,231,442 | B2 * | 1/2016 | Senba | H02J 13/00 |
| 9,257,864 | B2 * | 2/2016 | Pahlevaninezhad | H02J 7/022 |
| 9,312,703 | B2 * | 4/2016 | Takeda | H02J 7/0024 |
| 9,318,911 | B2 * | 4/2016 | Yao | H02J 7/0081 |
| 9,401,642 | B2 * | 7/2016 | Nakamura | H02M 3/158 |
| 9,487,098 | B2 * | 11/2016 | Yamada | H02M 3/3376 |
| 9,543,882 | B2 * | 1/2017 | Watabu | H02P 27/06 |
| 9,590,438 | B2 * | 3/2017 | Dalton | H02J 7/0063 |
| 2003/0122899 | A1 * | 7/2003 | Kojoh | B41J 2/04541 347/68 |
| 2003/0227280 | A1 * | 12/2003 | Vinciarelli | H02J 1/102 323/265 |
| 2005/0139591 | A1 * | 6/2005 | Takamatsu | G03G 15/205 219/663 |
| 2005/0219288 | A1 * | 10/2005 | Vogeley | F04B 43/0081 347/10 |
| 2005/0225579 | A1 * | 10/2005 | Umeda | B41J 2/04541 347/9 |
| 2005/0229700 | A1 * | 10/2005 | Chai | C02F 1/003 73/304 R |
| 2007/0132795 | A1 * | 6/2007 | Han | B41J 29/393 347/9 |
| 2007/0212103 | A1 * | 9/2007 | Kikuchi | G03G 15/0283 399/88 |
| 2007/0216714 | A1 * | 9/2007 | Sato | B41J 2/0458 347/5 |
| 2007/0247107 | A1 | 10/2007 | Wang | |
| 2009/0121782 | A1 * | 5/2009 | Oyama | H02M 3/07 327/536 |
| 2009/0295845 | A1 * | 12/2009 | Nakata | B41J 2/04541 347/1 |
| 2009/0309423 | A1 | 12/2009 | Utsumi | |
| 2009/0315521 | A1 * | 12/2009 | Watanabe | H02H 9/001 320/166 |
| 2011/0012566 | A1 * | 1/2011 | Sasaki | H02J 7/0016 320/166 |
| 2011/0115520 | A1 * | 5/2011 | Horsky | G01R 31/028 324/764.01 |
| 2012/0133693 | A1 * | 5/2012 | Iijima | B41J 2/04541 347/10 |
| 2014/0152243 | A1 * | 6/2014 | Xu | H02J 7/007 320/107 |
| 2014/0240383 | A1 * | 8/2014 | Penberth | H01L 41/042 347/10 |
| 2015/0256089 | A1 * | 9/2015 | Yamada | H02M 3/3376 363/17 |
| 2016/0226423 | A1 * | 8/2016 | Watabu | H02P 27/06 |
| 2016/0347059 | A1 * | 12/2016 | Ishikawa | B41J 2/04515 |
| 2016/0347097 | A1 * | 12/2016 | Ogasawara | B41J 23/00 |
| 2016/0347103 | A1 * | 12/2016 | Okita | B41J 29/38 |

FOREIGN PATENT DOCUMENTS

| | | | |
|---|---|---|---|
| EP | 2428809 | A2 | 3/2012 |
| JP | H08-180907 | A | 7/1996 |
| JP | 2007259633 | A | 10/2007 |
| JP | 2009-286096 | A | 12/2009 |
| JP | 2011211846 | A * | 10/2011 |
| JP | 2012120267 | A | 6/2012 |
| JP | 2014000743 | A | 1/2014 |

\* cited by examiner

POWER SUPPLY APPARATUS, PRINTER, AND CONTROL METHOD

BACKGROUND OF THE INVENTION

Field of the Invention

The present invention relates to power supply apparatuses and control methods, and particularly relates to a power supply apparatus including a unit which controls an on state and an off state of power supply to a load, a printer, and a control method.

Description of the Related Art

In recent years, the number of nozzles which eject ink is increased so that a printing speed and printing resolution are improved in inkjet recording apparatus (hereinafter also referred to as a "recording apparatus"). For example, in a case of a recording apparatus employing a thermal method, a heater is disposed in a position near an ink ejection port and electric power is supplied to the heater so that ink is instantaneously transformed into bubbles and the ink is ejected by kinetic energy of the bubbles.

In such a recording apparatus, an amount of electric power consumed at a time of image forming is changed depending on density of an image. In a case where an image of high density is to be formed, a large number of nozzle driving heaters are instantaneously turned on so as to eject a large amount of ink on a sheet surface, and large current is supplied to a head including the nozzles in a short time.

In a case where large current is to be instantaneously supplied, impedance of a power source is required to be reduced, and therefore, a printer configured such that an electrolytic capacitor having a small equivalent series resistance value and a large capacitance is connected to a power source line near a recording head has been widely used (refer to Japanese Patent Laid-Open No. 2009-286096).

In Japanese Patent Laid-Open No. 2009-286096, a push-pull circuit which restricts current so that inrush current is not generated when charge to the electrolytic capacitor or discharge from the electrolytic capacitor is performed is provided.

Here, in a case where an electrolytic capacitor having a large capacitance is connected to a head power source circuit, it is likely that a charge time of the electrolytic capacitor becomes long. Therefore, if large current is supplied to the power source circuit so that the charge time of the electrolytic capacitor is reduced, it is difficult to detect failure of a device including the power source circuit and a head which is caused by short-circuit or the like.

SUMMARY OF THE INVENTION

The present invention provides a power supply apparatus including a power source unit configured to supply electric power to an electric load, a capacitor connected to a power supply line extending from the power supply unit to the electric load, a charge circuit configured to charge the capacitor while restricting a current value of the electric power supplied from the power source unit, a specifying unit configured to specify a voltage value of the capacitor, a first determination unit configured to determine whether the charge of the capacitor is completed in accordance with the voltage specified by the specifying unit, and a second determination unit configured to determine whether the voltage specified by the specifying unit is equal to or smaller than an error threshold value after the first determination unit determines that the charge of the capacitor is completed. If the first determination unit determines that the charge of the capacitor is completed, the charge circuit switches a current value of the charge circuit to a first current value which is smaller than a current value supplied before the charge of the capacitor is completed. The second determination unit performs the determination while the first current value is supplied.

Further features of the present invention will become apparent from the following description of exemplary embodiments with reference to the attached drawings.

DESCRIPTION OF THE EMBODIMENTS

Hereinafter, embodiments of the present invention will be described with reference to the accompanying drawings.

First Embodiment

Figure 1:
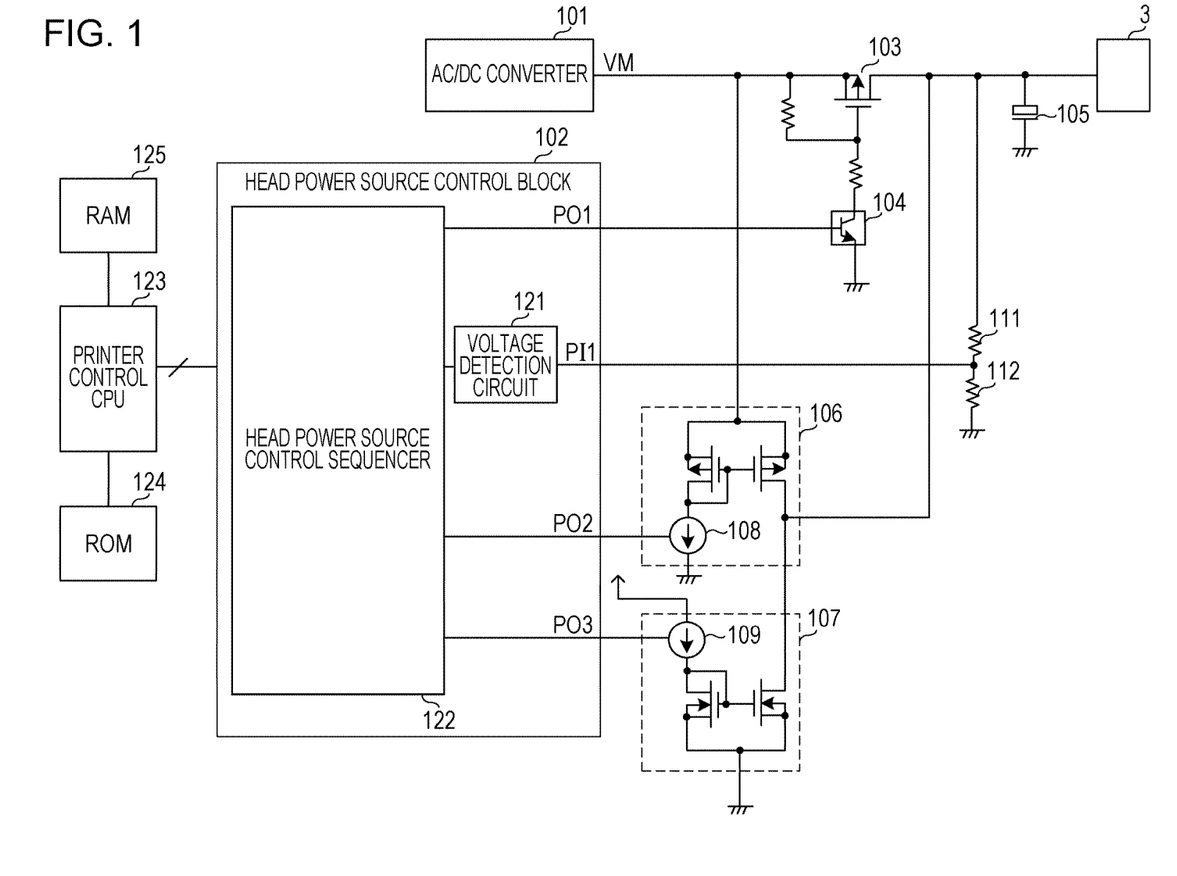
FIG. 1 is a block diagram illustrating a configuration of a control circuit of a printer according to a first embodiment.

FIG. 1 is a block diagram illustrating a main configuration of a control circuit of a printer which is an example of a power supply apparatus according to a first embodiment. Although a printer having a printing function is described as an example in FIG. 1, the printer is not limited to this, and a multifunction printer having a printing function and a reading function, for example, may be used. Furthermore, the power supply apparatus is not limited to the printer, and the power supply apparatus may not include a printing function as long as the power supply apparatus supplies electric power to a load.

The printer illustrated in FIG. 1 includes a power source circuit 101, a head power source control block 102, a printer control CPU 123 (hereinafter referred to as a "CPU 123"), a RAM 125, a ROM 124, and a charge circuit 106, a discharge circuit 107, a recording head 3, and an electrolytic capacitor 105. The printer further includes a field effect transistor (FET) 103 and a transistor 104. In this embodiment, "electric power supplied from a power source" means electric power supplied from the power source circuit 101 to the recording head 3.

The power source circuit 101 is a so-called power source unit, and is an AC/DC converter which generates a DC voltage for driving the head 3 from an AC power source not illustrated. In FIG. 1, the DC voltage output from the power source circuit 101 is denoted by "VM".

The printer control CPU 123 is a central processing unit which controls the entire recording apparatus, and controls operation of the entire printer by executing programs or activating hardware.

The ROM 124 stores the programs for controlling the entire printer and setting parameters. The RAM 125 is used as a work area for converting a print job which is externally input into print data and for developing programs, and temporarily stores parameters and image data.

The head power source control block 102 includes a head power source control sequencer 122 and a circuit 121 which detects a power source voltage of the head 3, and controls electric power to be supplied to the head 3. The voltage detection circuit 121 detects a voltage value of a power supply line used to supply electric power to the recording head 3 (a head power source voltage value). Note that the head power source voltage value is also referred to as an "electrolytic capacitor voltage value" hereinafter. This is because a voltage of the electrolytic capacitor 105 is equal to the head power source voltage. The voltage detection circuit 121 may be an AD converter or a circuit including a plurality of comparators which are aligned and having a plurality of threshold values. The head power source voltage is divided by resistances 111 and 112 and supplied to the voltage detection circuit 121 through an input terminal PI1. A head power source control sequencer 122 controls an on state and an off state of the transistor 104 by outputting a signal from an output terminal PO1. Furthermore, the head power source control sequencer 122 controls current values of the charge circuit 106 and the discharge circuit 107. Moreover, the head power source control sequencer 122 controls a current value output from the charge circuit 106 by outputting a signal from an output terminal PO2 and controls a current value discharged from the discharge circuit 107 by outputting a signal from an output terminal PO3.

The CPU 123 and the head power source control block 102 may be implemented in an LSI as the same integrated circuit or different LSIs.

The recording head 3 is an electric load and performs a printing operation (and also referred to as a "print head"). Note that, in this embodiment, the recording head 3 includes different ink tanks of different colors, and performs recording by ejecting ink droplets on a recording medium (such as a sheet). Note that the recording head 3 may eject ink while moving along a shaft supporting a head carriage in a direction orthogonal to a conveyance direction or may have a line head having nozzle arrays of different colors in the conveyance direction. Furthermore, the printer of this embodiment performs printing by a thermal method, and includes a plurality of heaters in the vicinity of an ink ejection port. Electric power is supplied to the heaters so that ink is instantaneously transformed into bubbles and the ink is ejected by kinetic energy of the bubbles.

The electrolytic capacitor 105 supplies electric power to the recording head 3 and has a function of absorbing a load change which is changed depending on an ink discharge state. The electrolytic capacitor 105 and the recording head 3 are connected to the power supply line (a line for supplying electric power) in parallel. In this embodiment, the electrolytic capacitor 105 has a small equivalent serial resistance value and large capacity. Since the electrolytic capacitor 105 having large capacity is used, a large amount of charge accumulated in the electrolytic capacitor 105 is supplied as instantaneous electric power when an image of high density is to be formed. By this, drop of a voltage for driving the heaters is suppressed even in a state in which large current is instantaneously supplied, and accordingly, stable ink ejection may be realized.

The FET 103 is turned on when the recording head 3 requires large electric power for a printing operation. In this embodiment, a gate is opened or closed when the transistor 104 is turned on or off as PMOS. The transistor 104 is connected to the output terminal PO1 of the head power source control block 102 and turned on or off when a signal supplied from the head power source control sequencer 122 is in a high level or a low level. Note that, in this embodiment, the FET 103 is in an off state when the charge circuit 106 charges the electrolytic capacitor 105.

The charge circuit 106 is used to charge the electrolytic capacitor 105. The discharge circuit 107 is used to perform discharge from the electrolytic capacitor 105.

The charge circuit 106 charges the electrolytic capacitor 105 while restricting a current value of electric power supplied from the power source circuit 101. The charge circuit 106 which is a constant current circuit having a current mirror structure includes a FET and a constant current source 108 which generates a reference current. The constant current source 108 is controlled by the output terminal PO2 of the head power source control block 102 and capable of performing switching of a current value in a plurality of stages. In this embodiment, a charge time may be reduced by switching of current supplied from the charge circuit 106. Specifically, current supplied from the charge circuit 106 has a high current value when the electrolytic capacitor 105 is charged, whereas current supplied from the charge circuit 106 has a low current value after the charge of the electrolytic capacitor 105 is completed. Note that the switching of a current value performed by the constant current source 108 will be described in detail later. As with the charge circuit 106, the discharge circuit 107 which is also a constant current circuit having a current mirror structure also includes a FET and a constant current source 109 which generates a reference current. Furthermore, the constant current source 109 is connected to the output terminal PO3 of the head power source control block 102, and as with the constant current source 108, is capable of performing switching of a current value in a plurality of stages.

Figure 2A:
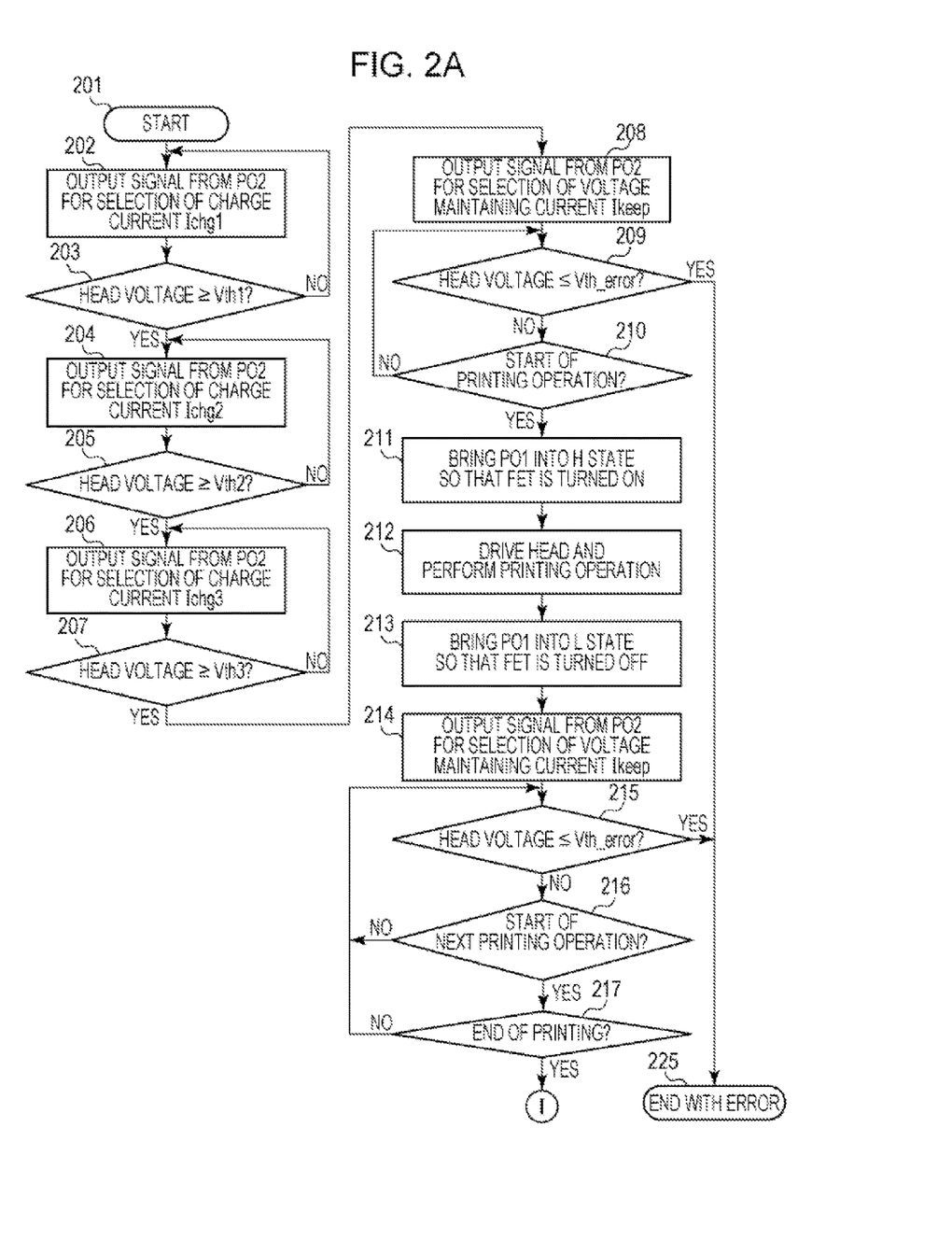
FIGS. 2A and 2B are a flowchart illustrating an operation of supplying electric power to a recording head according to the first embodiment.
Figure 2B:
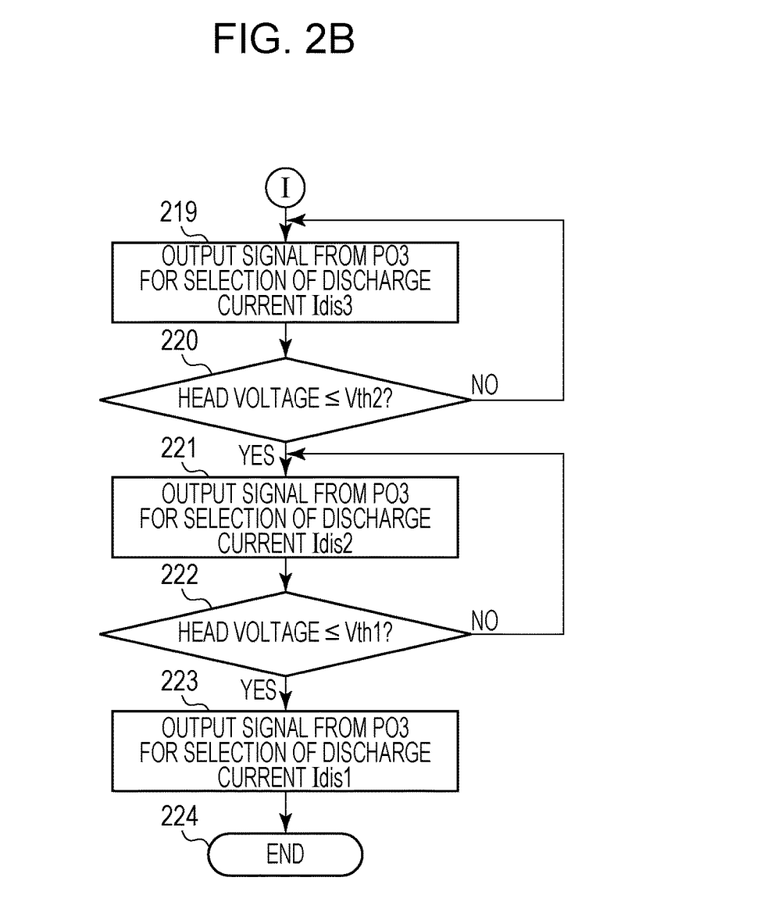

A sequence of a voltage monitoring operation of a head power source according to this embodiment will be described with reference to FIG. 1, FIGS. 2A and 2B, and FIGS. 3A to 3C. FIGS. 2A and 2B are a flowchart illustrating an operation of supplying electric power to the recording head 3. Furthermore, FIGS. 3A and 3B are timing charts illustrating charge to the electrolytic capacitor 105 and discharge from the electrolytic capacitor 105, and illustrating a portion of the flow of FIGS. 2A and 2B.

The flowchart illustrated in FIGS. 2A and 2B is realized when the CPU 123 reads a program stored in the ROM 124 into the RAM 125 and executes the program. Specifically, a flow from reception of a print instruction by the printer to a printing operation started when electric power is supplied to the recording head 3 which has not been turned on is illustrated.

When the printer receives a print instruction, control of a power source voltage is started (S201) and the electrolytic capacitor 105 is charged (S202 to S207). Here, "Ichg1", "Ichg2", and "Ichg3" illustrated in FIGS. 2A and 2B and FIGS. 3A to 3C denote charge currents supplied from the charge circuit 106 and are used depending on a voltage state of the electrolytic capacitor 105 in a switching manner. Specifically, when a voltage of the electrolytic capacitor 105 monitored by the voltage detection circuit 121 exceeds predetermined voltage threshold values (Vth1 and Vth2), a charge current value is increased to predetermined values (Ichg2 and Ichg3). In this way, in this embodiment, charge may be completed as quickly as possible while thermal restriction of the FET of the charge circuit 106 is satisfied by switching the charge current value. In this embodiment, heat obtained by a product of a potential difference between a source and a drain of the FET of the charge circuit 106 and a current value output from the charge circuit 106 is set to be equal to or lower than allowable power dissipation of the FET of the charge circuit 106. In a case where the potential difference between the source and the drain is VM−Vth1 and the current value is Ichg1, for example, an amount of heat generated in the charge circuit 106 is represented by "(VM−Vth1)×Ichg1". Similarly, in a case where the potential difference between the source and the drain is VM−Vth2 and the current value is Ichg2, for example, an amount of heat generated in the charge circuit 106 is represented by "(VM−Vth2)×Ichg2". Furthermore, in a case where the potential difference between the source and the drain is VM−Vth3 and the current value is Ichg3, for example, an amount of heat generated in the charge circuit 106 is represented by "(VM−Vth3)×Ichg3". All the amounts of heat (VM−Vth1)×Ichg1, (VM−Vth2)×Ichg2, and (VM−Vth3)×Ichg3 are set to be equal to or smaller than certain allowable power dissipation. Accordingly, the current value Ichg1 is comparatively small in a case where the voltage of the electrolytic capacitor 105 is equal to or smaller than the threshold value Vth1 which has a large potential difference from the voltage VM whereas the current value Ichg3 is comparatively large in the case where the voltage of the electrolytic capacitor 105 is equal to or larger than the threshold value Vth3 which has a small potential difference from the voltage VM. Although the switching of a current value among the three stages is illustrated in this embodiment, the present invention is not limited to this, and the number of stages of the switching of a current value may be larger or smaller than 3. First, the head power source control sequencer 122 outputs a signal from the output terminal PO2 so as to select the charge current value Ichg1 of the charge circuit 106 (S202), and determines whether a voltage of the electrolytic capacitor 105 detected by the voltage detection circuit 121 is equal to or larger than the threshold value Vth1 (S203). When determining that the voltage of the electrolytic capacitor 105 is equal to or larger than the threshold value Vth1 (Yes in step S203), the head power source control sequencer 122 outputs a signal from the output terminal PO2 so as to select the charge current value Ichg2 of the charge circuit 106 (S204). Specifically, the charge current value of the charge circuit 106 is switched from Ichg1 to Ichg2. Then, the voltage detection circuit 121 determines whether the voltage of the electrolytic capacitor 105 detected by the voltage detection circuit 121 is equal to or larger than the threshold value Vth2 (S205). When determining that the voltage of the electrolytic capacitor 105 is equal to or larger than the threshold value Vth2 (Yes in step S205), the head power source control sequencer 122 outputs a signal from the output terminal PO2 so as to select the charge current value Ichg3 of the charge circuit 106 (S206). Specifically, the charge current value of the charge circuit 106 is switched from Ichg2 to Ichg3.

Figure 3A:
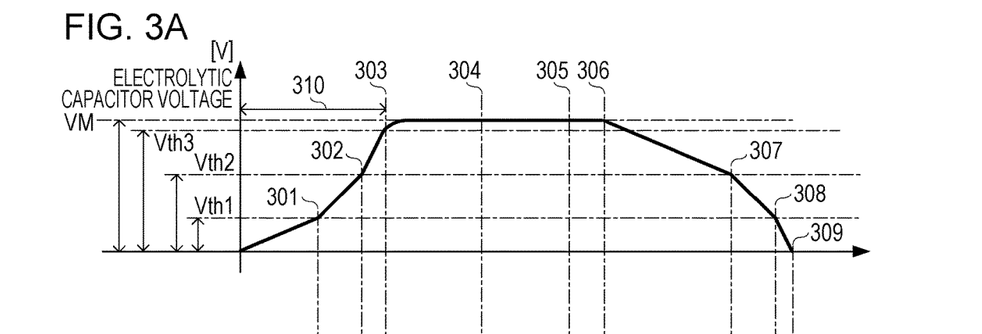
FIGS. 3A to 3C are timing charts illustrating charge to and discharge from an electrolytic capacitor.
Figure 3B:
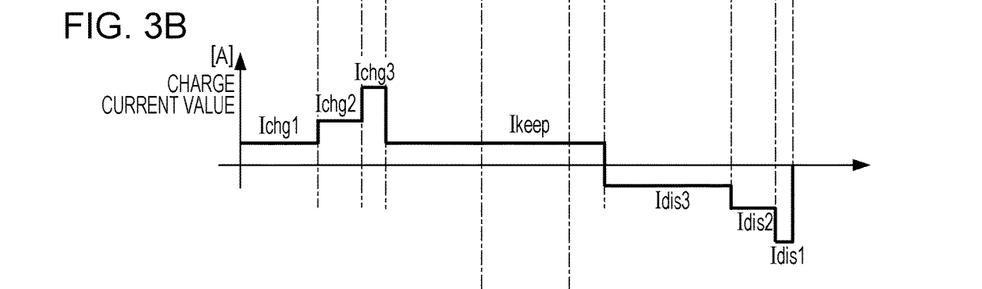
Figure 3C:
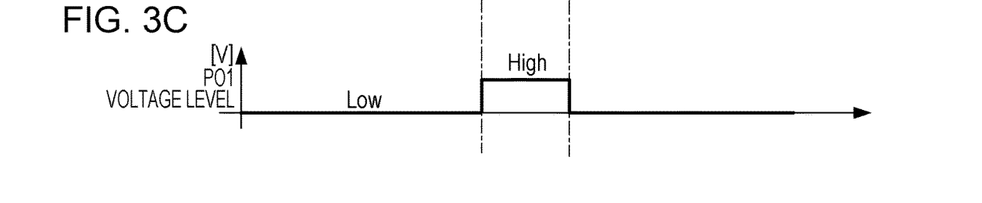

FIG. 3A is a timing chart illustrating a voltage of the electrolytic capacitor 105 monitored by the voltage detection circuit 121. FIG. 3B is a timing chart illustrating charge current to the electrolytic capacitor 105 and discharge current from the electrolytic capacitor 105, and FIG. 3C is a timing chart illustrating a voltage level of the output terminal PO1.

A curve of voltage rise becomes steep in a period 310 in which the electrolytic capacitor 105 is charged. This is because, as illustrated in FIG. 3B, the charge current value is switched from Ichg1 to Ichg2 at a timing 301 when the voltage of the electrolytic capacitor 105 becomes equal to or larger than the threshold value Vth1.

After the charge current value Ichg3 is selected, it is determined whether the voltage of the electrolytic capacitor 105 detected by the voltage detection circuit 121 is equal to or larger than the threshold value Vth3 (S207). When it is determined that the voltage of the electrolytic capacitor 105 is equal to or larger than the threshold value Vth3 (Yes in step S207), the head power source control sequencer 122 outputs a signal from the output terminal PO2 so as to select a current value Ikeep for maintaining a voltage as a charge current value of the charge circuit 106 (S208). Specifically, the charge current value of the charge circuit 106 is switched from Ichg3 to Ikeep. In the state of the current value Ikeep, increase of leakage may be detected while the voltage of the electrolytic capacitor 105 is maintained. Accordingly, the current value Ikeep is smaller than a value obtained when the charge current value is increased (Ichg3, for example). In this embodiment, the current value Ikeep is smaller than the current value Ichg1, that is, the current value supplied from the charge circuit 106 at a time of charging.

Then, it is determined whether the voltage of the electrolytic capacitor 105 detected by the voltage detection circuit 121 is equal to or smaller than a threshold value Vth_error (S209). When it is determined that the voltage of the electrolytic capacitor 105 is not equal to or smaller than the threshold value Vth_error (No in step S209), the process proceeds to step S210, and otherwise (Yes in step S209), the process proceeds to step S225 and is terminated as an error. Here, the threshold value Vth_error is used to specify failure of the power source circuit 101 and failure of the head 3. When the voltage of the electrolytic capacitor 105 is equal to or smaller than the threshold value Vth_error, it is determined that failure occurs in at least one of the power source circuit 101 and the head 3. Note that monitoring of the voltage of the electrolytic capacitor 105 is performed after the electrolytic capacitor 105 is charged and before discharge is performed. The current value Ikeep and the sequence of step S209 will be described later. Examples of a case where failure occurs in the power source circuit 101 or the head 3 include a case where insulation failure occurs in an electric contact of the recording head 3, a case where leakage current of the recording head 3 is increased, and a case where the power source circuit 101 is short-circuited. In this case, a potential becomes equal to or smaller than the certain voltage (Vth_error). In this case, when printing is executed, printing failure or failure of the printer occurs.

When the charge circuit 106 completes the charge of the electrolytic capacitor 105 and print data is prepared, it is determined that the printing operation is to be started (S210). First, in step S211, a voltage level of the output terminal PO1 of the head power source control sequencer 122 is brought into a high level (refer to a timing 304 of FIG. 3C). In other words, the head power source control sequencer 122 outputs a signal from the output terminal PO1 so as to turn on the transistor 104. By this, the FET 103 is turned on. Note that, if the FET 103 is not to be turned on, current supplied from the charge circuit 106 to the power supply line is in an Ikeep state, and therefore, electric power to be consumed by the head 3 for printing is not efficiently ensured. When the printing operation of the recording head 3 in step S212 is completed, the voltage level of the output terminal PO1 is brought into a low level in step S213 (refer to a timing 305 of FIG. 3C). By this, the FET 103 in FIG. 1 is turned off. Then, the head power source control sequencer 122 outputs a signal from the output terminal PO2 so as to select the charge current value Ikeep of the charge circuit 106 (S214). That is, current of the charge current value Ikeep is supplied to the head 3 again.

Then, it is determined whether the voltage of the electrolytic capacitor 105 detected by the voltage detection circuit 121 is equal to or smaller than the threshold value Vth_error (S215). When it is determined that the voltage of the electrolytic capacitor 105 is not equal to or smaller than the threshold value Vth_error (No in step S215), the process proceeds to step S216, and otherwise (Yes in step S215), it is determined that an error is detected and an error process is performed. As the error process (S225), the FET 103 of FIG. 1 is turned off and the charge circuit 106 of FIG. 1 is turned off. Furthermore, the discharge circuit 107 may be turned on so that discharge is actively performed, for example.

With the charge circuit 106 supplying current of the charge current value Ikeep to the head 3 from step S214 and when print data is prepared, it is determined that the printing operation is to be started (Yes in step S216). In step S217, it is determined whether the printing has been terminated. When it is determined that the printing has been terminated (Yes in step S217), control for discharge of the head power supply capacitor 105 is performed (S219 to S223). The electrolytic capacitor 105 performs discharge while restricting current using the discharge circuit 107. Here, as with the case of the charge of the electrolytic capacitor 105, when the electrolytic capacitor 105 performs discharge, a setting is performed such that a thermal restriction of the FET of the discharge circuit 107 is satisfied. Heat obtained by a product of a potential difference between a source and a drain of the FET of the discharge circuit 107 and an absolute value of a value of current supplied to the discharge circuit 107 is set to be equal to or lower than allowable power dissipation of the FET of the discharge circuit 107. In a case where the potential difference between the source and the drain corresponds to the threshold value Vth3 and the current value is denoted by Idis3, for example, an amount of heat generated in the discharge circuit 107 is represented by "Vth3× Idis3". Similarly, in a case where the potential difference between the source and the drain corresponds to the threshold value Vth2 and the current value is denoted by Idis2, for example, an amount of heat generated in the discharge circuit 107 is represented by "Vth2×Idis2". Furthermore, in a case where the potential difference between the source and the drain corresponds to the threshold value Vth1 and the current value is denoted by Idis1, for example, an amount of heat generated in the discharge circuit 107 is represented by "Vth1×Idis1". All the amounts of heat Vth3×Idis3, Vth2× Idis2, and Vth1×Idis1 are set to be equal to or smaller than certain allowable power dissipation.

First, the head power source control sequencer 122 outputs a signal from the output terminal PO3 so as to select the discharge current value Idis3 of the discharge circuit 107 (S219). Here, the potential difference between the source and the drain of the FET of the discharge circuit 107 corresponds to a difference between GND and the head power source voltage, and therefore, the larger a head power source potential is, the larger the potential difference is. Accordingly, a small value is set to the charge current Idis3 in FIG. 3B from a timing 306 to a timing 307.

Then, it is determined whether the voltage of the electrolytic capacitor 105 detected by the voltage detection circuit 121 is smaller than the threshold value Vth2 (S220). When it is determined that the voltage of the electrolytic capacitor 105 detected by the voltage detection circuit 121 is smaller than the threshold value Vth2 (Yes in step S220), the head power source control sequencer 122 outputs a signal from the output terminal P03 so as to select the discharge current value Idis2 of the discharge circuit 107 (S221). Specifically, the discharge current is switched from Idis3 to Idis2 at the timing 307. Here, a value slightly larger than the discharge current value Idis3 is set as the discharge current value Idis2. Then, it is determined whether the voltage of the electrolytic capacitor 105 detected by the voltage detection circuit 121 is smaller than the threshold value Vth1 (S222). When it is determined that the voltage of the electrolytic capacitor 105 detected by the voltage detection circuit 121 is smaller than the threshold value Vth1 (Yes in step S222), the head power source control sequencer 122 outputs a signal from the output terminal PO3 so as to select the discharge current value Idis1 of the discharge circuit 107 (S223). Specifically, the discharge current is switched from Idis2 to Idis1 at a timing 308. Then the discharge is completed at a timing 309 as illustrated in FIG. 3B and the process ends at step S224.

Figure 7A:
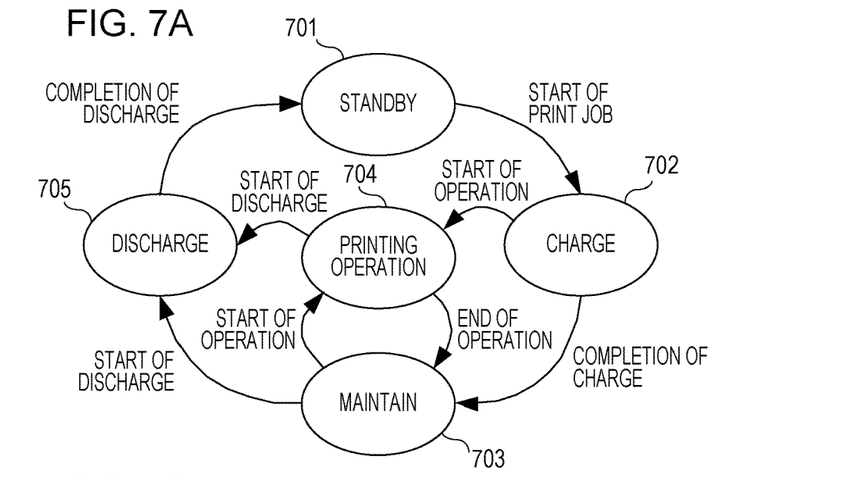
FIGS. 7A to 7C are diagrams illustrating state transition of a control flow according to the first embodiment.
Figure 7B:
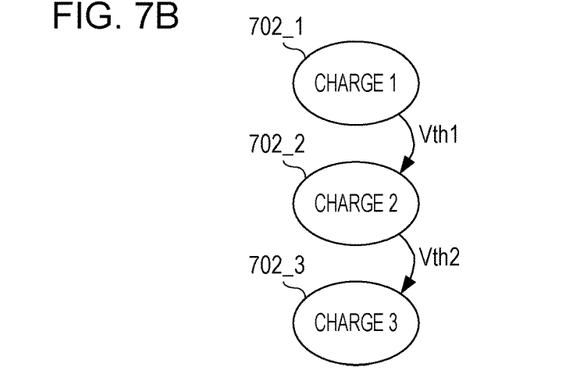
Figure 7C:
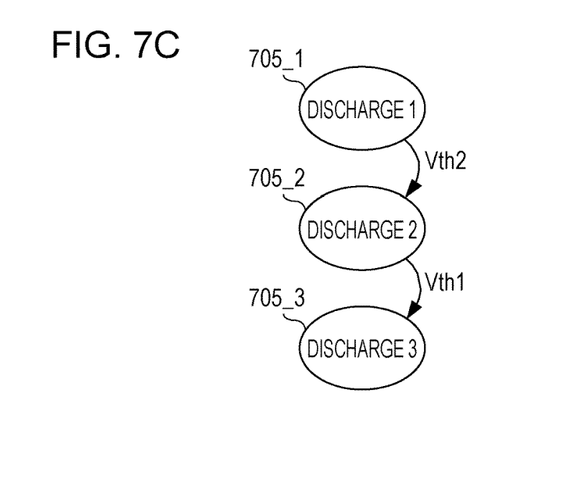

The head power source control block 102 will now be described. FIGS. 7A to 7C are diagrams illustrating management of states in the head power source control sequencer 122. In FIG. 7A, a state in which the head 3 is turned off is denoted by a "standby 701". When a print job is input, a charge state 702 is entered so that the head 3 is turned on. FIG. 7B is a diagram illustrating a state transition in a case where the charge state 702 is described in detail. As illustrated in FIG. 7B, the charge state is changed when charge current is changed in accordance with the voltage of the electrolytic capacitor 105 in the charge state 702. When the voltage of the electrolytic capacitor 105 becomes equal to or large than the threshold value Vth1 (e.g., Yes at step S203), a first charge state 702_1 shifts to a second charge state 702_2. Here, the charge current is switched from Ichg1 to Ichg2. Similarly, when the voltage of the electrolytic capacitor 105 becomes equal to or large than the threshold value Vth2 (e.g., Yes at S205), the second charge state 702_2 shifts to a third charge state 702_3, and the charge current is switched from Ichg2 to Ichg3.

When the voltage of the electrolytic capacitor 105 becomes equal to or larger than the threshold value Vth3 and the charge is completed, a maintaining state 703 of FIG. 7A is entered. Therefore, the charge current is switched to Ikeep. When the printing operation is started, a printing operation state 704 is entered. The maintaining state 703 and the printing operation state 704 are alternately entered until the print job is completed. Note that, although the maintaining state 703 is entered after the charge state 702 in this embodiment, the printing operation state 704 may be directly entered after the charge state 702 if the printing operation is desired to be quickly started.

When the printing operation is terminated, a discharge state 705 is entered. Even in a case where failure is detected while the head power source voltage is monitored, the discharge state 705 is entered. Although it is likely that failure is detected while the head power source voltage is monitored especially in the maintaining state 703, if failure is detected in the printing operation state 704, the discharge state 705 may be immediately entered. If failure is detected while the head power source voltage is monitored in the printing operation state 704, the discharge state 705 may be entered through the maintaining state 703.

FIG. 7C is a diagram illustrating state transition in a case where the discharge state 705 is described in detail. As illustrated in FIG. 7C, the discharge state is changed by changing current in accordance with the voltage of the electrolytic capacitor 105. Specifically, a first discharge state 705_1 shifts to a second discharge state 705_2 and the second discharge state 705_2 shifts to a third discharge state 705_3, and in addition, discharge current shifts from Idis3 to Idis2 and from Idis2 to Idis1. When the discharge is completed, the standby 701 is entered.

Operation of the CPU 123 according to this embodiment will be described.

The CPU 123 manages the entire print control and normal operation of a head power source as described below.

(1) A print instruction is received from an external apparatus connected to the printer or a print instruction, such as a copy operation instruction, is received through an operation unit of the printer. In response to the print instruction, the CPU 123 outputs an instruction for turning on the head power source to the head power source control block 102 in parallel to start of preparation of print data from print job data. The head power source control block 102 starts the flow illustrated in FIGS. 2A and 2B in response to the instruction for turning on the head power source (S201).

(2) The CPU 123 monitors a state of the head power source control sequencer 122 so as to determine whether the third charge state or the maintaining state is entered in parallel to the preparation of print data from print job data. Although the CPU 123 monitors the state of the head power source control sequencer 122 in this embodiment, the present invention is not limited to this. For example, the CPU 123 may determine whether the head power source voltage is equal to or larger than the threshold value Vth3 in accordance with an output value of the voltage detection circuit 121 and a value obtained by directly inputting the divided voltages of the resistances 111 and 112 and performing AD conversion on the divided voltages. When determining that the third charge state or the maintaining state is entered, the CPU 123 periodically monitors the output value of the voltage detection circuit 121 and the value obtained by directly inputting the divided voltages of the resistances 111 and 112 and performing the AD conversion on the divided voltages. When the values correspond to a "state in which the head power source voltage is equal to or smaller than the threshold value Vth_error", the CPU 123 determines that a failure state is detected and performs an error process.

(3) When the preparation of print data is completed in a non-error state, the CPU 123 determines that printing is available and outputs an instruction for starting a printing operation to the head power source control block 102. In response to the instruction for starting a printing operation, the head power source control block 102 performs the process in step S211. Thereafter, the CPU 123 transmits the print data to the head 3 and performs a printing operation.

(4) When the printing operation is completed, the CPU 123 outputs an instruction for terminating the printing operation to the head power source control block 102. In response to the instruction for terminating the printing operation, the head power source control block 102 performs the process in step S213.

(5) If next print job data exists, the process from (2) to (3) is performed again.

(6) If next print job data does not exist, the CPU 123 outputs an instruction for turning off the head power source to the head power source control block 102. In response to the instruction for turning off the head power source, the head power source control block 102 performs the process in step S219.

Figure 6A:
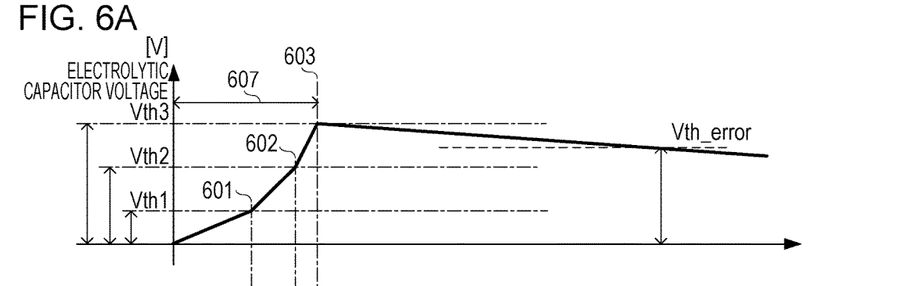
FIGS. 6A and 6B are timing charts illustrating an electrolytic capacitor voltage, head charge current, and leakage current obtained when a current value set for maintaining a voltage is small.
Figure 6B:
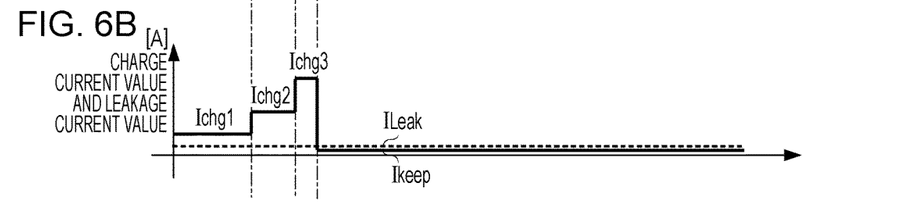

The current value Ikeep after a timing 303 illustrated in FIG. 3B will now be described. In the head power source circuit 101, after the charge of the electrolytic capacitor 105 of the head is completed, electric charge may be reduced owing to various reasons and discharge may be naturally performed even when failure does not occur in the device including the power source circuit 101 and the electric load 3. Examples of causes of natural discharge include current supplied to the resistances 111 and 112 for voltage detection of FIG. 1 and leakage current naturally generated since the head 3 is manufactured by a semiconductor process. By preventing drop of the head power source voltage owing to these phenomena, the printing operation may be immediately started even when a certain period of time has elapsed after the charge operation. Accordingly, a value larger than these natural discharge currents is set to the current value Ikeep. The natural discharge current may be estimated in advance from the configuration of the power source circuit 101 and the configuration of the device including the load 3. The current value Ikeep is larger than the estimated natural discharge current. A lower limit of the current value Ikeep will be described in detail with reference to FIGS. 6A and 6B. FIGS. 6A and 6B are timing charts illustrating a head power source voltage, head charge current, and leakage current obtained when a current value set for maintaining a voltage is smaller than natural discharge current. More specifically, FIGS. 6A and 6B are timing charts when a value smaller than natural discharge current is set. In FIG. 6A, a state of the voltage of the electrolytic capacitor 105 is illustrated. Furthermore, FIG. 6B is a timing chart of a current value in charging and a current value in natural discharge, and a current value ILeak denoted by a dotted line represents a current value of the natural discharge in the head power source circuit 101. In FIG. 6B, the current value Ikeep is smaller than the current value ILeak. Accordingly, as illustrated in FIG. 6A, the voltage of the electrolytic capacitor 105 gradually drops from a timing 603 when the current value of the charge circuit 106 is switched to the Ikeep current and reaches the threshold value Vth_error after a certain period of time has elapsed. Here, the threshold value Vth_error is used to determine failure to be detected when the head power source voltage is monitored after the charge of the electrolytic capacitor 105 is completed. The monitor of the voltage of the power supply line is executed by monitoring a voltage of the input terminal PI1 illustrated in FIG. 1 by the voltage detection circuit 121. When the current value Ikeep is set to be equal to or smaller than the current value of the natural discharge in this way, failure of the head 3 may not be reliably detected. Accordingly, a value larger than the current value ILeak of the natural discharge is set as the current value Ikeep.

As described above, the monitoring of the voltage of the electrolytic capacitor 105 is executed in a period of time in which the printing operation is not performed. Specifically, the monitoring of the voltage of the electrolytic capacitor 105 is repeatedly performed in step S209 and step S210 of FIG. 2A so that the voltage of the electrolytic capacitor 105 is constantly monitored after the charge is completed and before the printing operation is started. In the flowchart of FIG. 2A, the monitoring of the voltage of the electrolytic capacitor 105 is repeatedly performed also in step S215 and step S216 so that a VH voltage is constantly monitored until the printing operation is terminated. Although the current value Ikeep is newly selected in step S214, the current value Ikeep may not be newly selected in step S214 in a case where the charge circuit 106 of FIG. 1 is not turned off. Although the voltage monitoring is performed in the period in which the printing operation is not performed in this embodiment, the voltage monitoring may be performed in the printing operation.

Figure 5A:
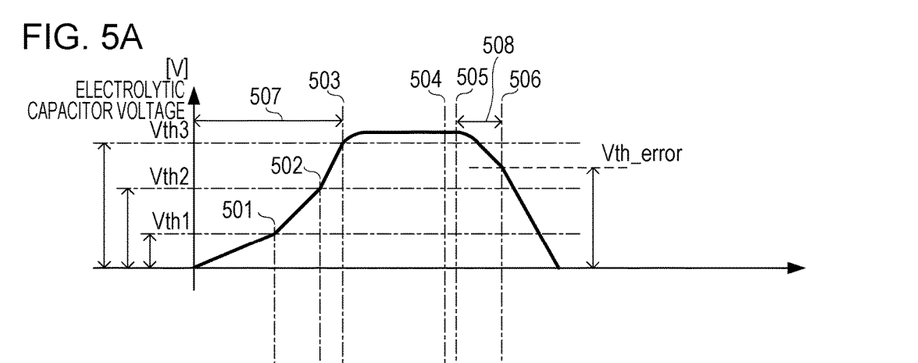
FIGS. 5A and 5B are timing charts illustrating an electrolytic capacitor voltage, head charge current, and leakage current obtained when abnormality is detected in the leakage current according to the first embodiment.
Figure 5B:
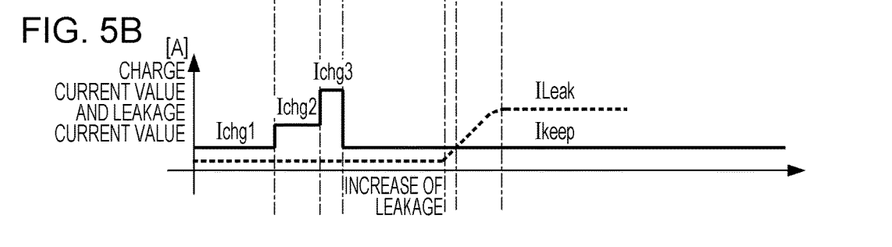

Next, an upper limit of the current value Ikeep will be described with reference to FIGS. 5A and 5B. In FIG. 5A, a state of the voltage of the electrolytic capacitor 105 when the electrolytic capacitor 105 is charged is illustrated. Furthermore, FIG. 5B is a diagram illustrating a value of current supplied from the charge circuit 106 which is charging the electrolytic capacitor 105 and a current value of discharge of the head power source circuit 101. In FIG. 5B, a current value ILeak of discharge is denoted by a dotted line. In FIG. 5B, the current value ILeak until a timing 504 represents a current value of natural discharge. The current value ILeak is smaller than the current values Ichg1, Ichg2, Ichg3, and Ikeep, and drop of a voltage as illustrated in FIGS. 6A and 6B does not occur.

Here, in a case where leakage other than the natural discharge occurs, that is, in a case where a terminal of the head 3 is short-circuited or leakage of the head 3 is increased for some reasons, the current value ILeak is increased as illustrated in FIG. 5B at the timing 504. As illustrated in FIG. 5A, the voltage of the electrolytic capacitor 105 gradually drops from a timing 505 when the current value ILeak exceeds the current value Ikeep. Thereafter, the voltage becomes smaller than the threshold value Vth_error at a timing 506, and therefore, failure is detected. The printer in which the failure is detected is capable of performing control such that the FET 103 of FIG. 1 is turned off, the charge circuit 106 of FIG. 1 is turned off, and the discharge circuit 107 is turned on so that discharge is actively performed.

Therefore, in this embodiment, a value equal to or smaller than a specific value is set to the current value Ikeep so that failure may be detected at an appropriate timing in the leakage current ILeak in a failure state. For example, in a case where behavior of the leakage current ILeak may be predicted, the current value Ikeep is set such that a result of integration of $\int \{ILeak(t) \times V(t)\}dt$ in a period 508 is equal to or smaller than a desired amount of heat. Furthermore, when the current value is equal to or smaller than the current value Ikeep, it is difficult to detect failure caused by the voltage drop, and therefore, the current value Ikeep may be set such that an amount of heat of VM×Ikeep is included in an allowable range.

Figure 4A:
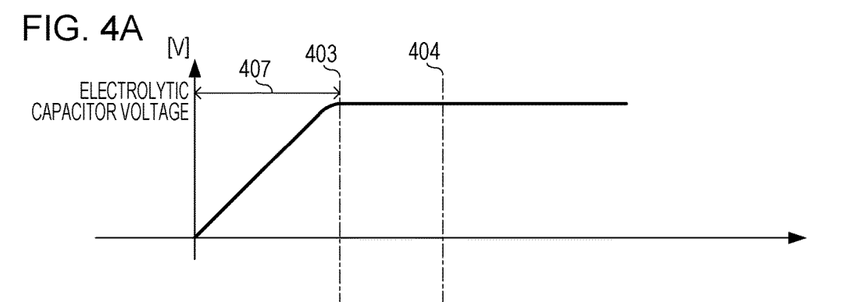
FIGS. 4A and 4B are timing charts illustrating an electrolytic capacitor voltage, head charge current, and leakage current obtained when abnormality is detected in the leakage current according to a comparative example.

As described above, according to this embodiment, switching is performed between a current value at the charge of the electrolytic capacitor 105 and a current value after the charge is completed. Then an arbitrary designed value is set to the current value Ikeep. Here, an effect of the switching of the value of the current supplied from the charge circuit 106 from a current value in a charge state (in charging) to a current value after the charge is completed (in the maintaining state, for example) will be described with reference to FIGS. 4A and 4B. In FIG. 4A, a state of the voltage of the electrolytic capacitor 105 when the electrolytic capacitor 105 is charged is illustrated. Furthermore, in FIG. 4B, a current value obtained when the electrolytic capacitor 105 is charged and a current value obtained when the head power source voltage is discharged are illustrated.

Figure 4B:
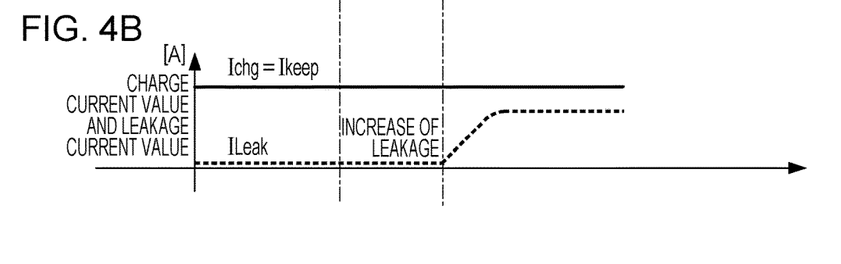

In FIG. 4A, since the constant current Ichg is supplied from the charge circuit 106, the voltage of the electrolytic capacitor 105 rises with a certain inclination in a period 407. Then, as illustrated in FIG. 4B, if switching of a current value is not performed after the voltage of the electrolytic capacitor 105 reaches a certain voltage and the charge is completed at a timing 403, that is, the current value is constant, failure may not be appropriately detected. Here, in a case where the terminal of the head 3 is short-circuited or the leakage of the head 3 is increased for some reasons at a timing 404 in FIG. 4B, although the leakage current is increased after the timing 404, the current value Ichg, that is, the current value Ikeep is large. If the current value Ichg or Ikeep is larger than the leakage current value after the failure occurs, increase of the leakage current may not be detected when the failure occurs. If the current value supplied from the charge circuit 106 is reduced so that the increase of the leakage may be detected, the charge time 407 of the electrolytic capacitor 105 becomes long and an initial operation of the printer may take time. Accordingly, in this embodiment, the value of the current supplied from the charge circuit 106 after the charge is completed is suppressed to be smaller than a maximum current value in the charging. In this embodiment, the value of the current supplied from the charge circuit 106 is smaller than the maximum current value Ichg3 in the charging and the current value Ichg2 in the second stage. In this embodiment, occurrence of the failure of the head power source circuit 101 may be appropriately detected by reducing the current value after the charge is completed to be smaller than the current value in the charging. Specifically, when current is abnormally leaked from the recording head 3, the leakage current may be immediately detected and power supply to the recording head 3 may be stopped.

Furthermore, in a case where the current value Ichg is increased so that the charge time of the electrolytic capacitor 105 having large capacity is reduced, a FET having large allowable power dissipation is required to be selected which causes increase in cost. On the other hand, according to this embodiment, the charge time of the electrolytic capacitor 105 may be reduced to the extent that target performance of the recording apparatus is attained by performing the current switching in accordance with the allowable power dissipation of the FET of the charge circuit 106, and increase in cost of the FET 103 may be suppressed.

As described above, according to this embodiment, leakage current of the head 3 may be appropriately detected without deteriorating performance of the printer, and both of the excellent performance and the security of the printer may be realized.

Note that it is highly likely that cost is increased if a circuit for soft start is added to the AC/DC converter to suppress inrush current or a switch which has resistance to inrush current is provided. However, in this embodiment, inrush current to the FET 103 may be prevented since a value of current supplied to the power source circuit 101 is restricted by the charge circuit 106.

According to this embodiment, failure may be reliably specified while a charge time of the electrolytic capacitor 105 is reduced when the failure occurs in the power source circuit 101 or the load 3.

Other Embodiments

The present invention is not limited to the foregoing embodiments. Although the power supply apparatus includes the head as the electric load in the foregoing embodiments, the present invention is not limited to this, and the power supply apparatus may not include the electric load. Specifically, the power supply apparatus may be connectable to the electric load and may supply electric power to the electric load.

Furthermore, although a current value supplied from the charge circuit 106 is switched when the electrolytic capacitor 105 is charged in the foregoing embodiments, the present invention is not limited to this, and a current value supplied from the charge circuit 106 may be constant.

Furthermore, although a current value supplied from the charge circuit 106 is switched when the electrolytic capacitor 105 is charged in the foregoing embodiments, the current value may be gradually increased.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-107871, filed May 27, 2015, which is hereby incorporated by reference herein in its entirety.

What is claimed is:

1. A power supply apparatus comprising:
a power source circuit configured to supply electric power to an electric load;
a capacitor connected to a power supply line extending from the power source circuit to the electric load and configured to supply electric power to the electric load;
a charge circuit configured to charge the capacitor by supplying a current that is powered by the electric power supplied from the power source circuit;
a detection circuit configured to detect a voltage value of the capacitor; and
a controller configured to, in a case where the detected voltage value of the capacitor reaches a first threshold value,
control the charge circuit to change a current value of the current of the charge circuit from a first current value to a second current value that is smaller than the first current value, wherein the first current value is supplied before the detected voltage value reaches the first threshold value, and wherein the second current value is greater than zero, and
wherein, after the detected voltage value of the capacitor reaches the first threshold value, the controller is further configured to
continually determine, while the second current value is supplied to the capacitor, whether the detected voltage value of the capacitor is smaller than a second threshold value that is smaller than the first threshold value; and
cause a discharge of the capacitor in a case where the controller determines that the detected voltage value of the capacitor is smaller than the second threshold value.

2. The power supply apparatus according to claim 1, wherein the controller is further configured to cause the discharge of the capacitor by causing an increase in a current flow out of the capacitor.

3. The power supply apparatus according to claim 2, wherein the controller is further configured to cause the increase in the current flow out of the capacitor by activating a discharge circuit.

4. The power supply apparatus according to claim 1, wherein the second current value is larger than a natural discharge of the capacitor when connected to the power supply line.

5. The power supply apparatus according to claim 1, wherein, in a case where the controller causes the discharge of the capacitor, the charge circuit and the power source circuit are turned off.

6. The power supply apparatus according to claim 1, wherein, when the capacitor is charged, the charge circuit changes the current value of the current supplied from the charge circuit in accordance with the voltage value detected by the detecting circuit.

7. The power supply apparatus according to claim 6, wherein the charge circuit changes the current value of the current supplied from the charge circuit such that an amount of generated heat becomes equal to or smaller than an allowable power dissipation of the charge circuit, and
wherein a value for the amount of generated heat is obtained in accordance with (i) a difference between a value of a voltage supplied from the power source circuit and the voltage value of the capacitor detected by the detecting circuit and (ii) the value of the current supplied from the charge circuit.

8. The power supply apparatus according to claim 1, wherein the electric power supplied from the power source circuit when the electric load is to be operated is electric power in which a current value is not restricted.

9. The power supply apparatus according to claim 1, further comprising a discharge circuit configured to perform discharge from the capacitor.

10. The power supply apparatus according to claim 1, further comprising the electric load, wherein the electric load is a print head.

11. A printer comprising:
a print head, and
a power supply apparatus, wherein the power supply apparatus includes:
a power source circuit configured to supply electric power to the print head,
a capacitor connected to a power supply line extending from the power source circuit to the print head and configured to supply electric power to the print head,
a charge circuit configured to charge the capacitor by supplying a current that is powered by the electric power supplied from the power source circuit,
a detection circuit configured to detect a voltage value of the capacitor, and
a controller configured to, in a case where the detected voltage value of the capacitor reaches a first threshold value, control the charge circuit to change a current value of the current of the charge circuit from a first current value to a second current value that is smaller than the first current value,
wherein the first current value is supplied before the detected voltage value reaches the first threshold value,
wherein the second current value is greater than zero, and
wherein, after the detected voltage value of the capacitor reaches the first threshold value, the controller is further configured to
continually determine, while the second current value is supplied to the capacitor, whether the detected voltage value of the capacitor is smaller than a second threshold value that is smaller than the first threshold value, and
cause a discharge of the capacitor in a case where the controller determines that the detected voltage value of the capacitor is smaller than the second threshold value.

12. A method for controlling a power supply apparatus having a power source circuit configured to supply electric power to an electric load, a capacitor connected to a power supply line extending from the power source circuit to the electric load and configured to supply electric power to the electric load, and a charge circuit configured to charge the capacitor by supplying a current that is powered by the electric power supplied from the power source circuit, the method comprising:

detecting a voltage value of the capacitor;

determining whether the voltage value of the capacitor has reached a first threshold value;

in a case where the voltage value of the capacitor has reached the first threshold value, controlling the charge circuit to change a current value of a current of the charge circuit from a first current value to a second current value that is smaller than the first current value, wherein the first current value is supplied before the detected voltage value reaches the first threshold value, and wherein the second current value is greater than zero; and the detected voltage value of the capacitor reaches the first threshold value, continually determining, while the second current value is supplied to the capacitor, whether the detected voltage value of the capacitor is smaller than a second threshold value that is smaller than the first threshold value, and causing a discharge of the capacitor in a case where the detected voltage value of the capacitor is smaller than the second threshold value.

13. The power supply apparatus according to claim 1, wherein the power supply apparatus is configured for a printer.

14. The power supply apparatus according to claim 1, wherein, in a case where the controller determines that the detected voltage value of the capacitor is not smaller than the second threshold value and a condition is met to start an operation, the controller stops determining whether the detected voltage value of the capacitor is smaller than the second threshold value and the controller causes power to be supplied to the electric load from at least one of the power source circuit and the charged capacitor during performance of the operation.

15. The power supply apparatus according to claim 14, wherein, after performance of the operation, the controller resumes determining whether the detected voltage value of the capacitor is smaller than the second threshold value.

* * * * *